United States Patent [19]
Moses et al.

[11] Patent Number: 5,948,569
[45] Date of Patent: Sep. 7, 1999

[54] LITHIUM ION ELECTROCHEMICAL CELL

[75] Inventors: Peter R. Moses, Windham, N.H.;
Shuming Zeng, Norwood; Enoch Wang, Mansfield, both of Mass.;
Guang Wei, Southborough, Mass.

[73] Assignee: Duracell Inc., Bethel, Conn.

[21] Appl. No.: 08/897,775

[22] Filed: Jul. 21, 1997

[51] Int. Cl.$^6$ ...................................................... H01M 2/16
[52] U.S. Cl. .......................... 429/246; 429/129; 429/248;
429/94; 429/231.95; 29/623.1; 29/623.5
[58] Field of Search ..................................... 429/246, 248,
429/233, 218, 129, 137, 94, 623.5, 231.95;
29/623.1

[56] References Cited

U.S. PATENT DOCUMENTS

| | | | |
|---|---|---|---|
| 4,401,735 | 8/1983 | Moses et al. | 429/195 |
| 4,482,613 | 11/1984 | Turchan et al. | 429/53 |
| 4,594,299 | 6/1986 | Cook et al. | 429/129 |
| 4,622,277 | 11/1986 | Bedder et al. | 429/94 |
| 4,707,421 | 11/1987 | McVeigh, Jr. et al. | 429/94 |
| 4,816,356 | 3/1989 | Balkanski | 429/191 |
| 4,824,744 | 4/1989 | Kuo et al. | 429/209 |
| 4,840,856 | 6/1989 | Nakacho et al. | 429/192 |
| 4,937,154 | 6/1990 | Moses et al. | 429/94 |
| 5,028,500 | 7/1991 | Fong et al. | 429/194 |
| 5,069,683 | 12/1991 | Fong et al. | 29/623.1 |
| 5,077,152 | 12/1991 | Yoshino et al. | 429/209 |
| 5,147,739 | 9/1992 | Beard | 429/194 |
| 5,162,178 | 11/1992 | Ohsawa et al. | 429/218 |
| 5,202,201 | 4/1993 | Meunier et al. | 429/193 |
| 5,455,126 | 10/1995 | Bates et al. | 429/127 |
| 5,486,215 | 1/1996 | Kelm et al. | 429/94 |
| 5,522,955 | 6/1996 | Brodd | 156/182 |
| 5,597,665 | 1/1997 | Harada et al. | 429/235 |

FOREIGN PATENT DOCUMENTS

| | | |
|---|---|---|
| 0143562 A1 | 6/1985 | European Pat. Off. . |
| 0 328 131 A2 | 2/1989 | European Pat. Off. . |
| 0762521 A2 | 3/1997 | European Pat. Off. . |
| 0 817 294 A1 | 1/1998 | European Pat. Off. . |
| 2139714 | 2/1973 | Germany . |
| 61 294756 | 12/1986 | Japan . |
| 07 235330 | 9/1995 | Japan . |
| 09 027345 | 1/1997 | Japan . |
| 10 083835 | 3/1998 | Japan . |
| WO 90/13924 | 11/1990 | WIPO . |
| WO96/41394 | 12/1996 | WIPO . |

OTHER PUBLICATIONS

Chu et al., "Processing and Characterization of Carbon Electrodes for Li Ion Batteries" The Electrochemical Society Proceedings, vol. 94–28, pp. 196–206.

Bruno Scrosati, "Lithium Rocking Chair Batteries: An Old Concept?" J. Electrochem. Soc.., vol. 139, No. 10, pp. 2776–2781, Oct. 10, 1992.

*Primary Examiner*—Bruce F. Bell
*Attorney, Agent, or Firm*—Fish & Richardson P.C.

[57] ABSTRACT

A lithium ion cell having an amount of a Group 1 element between the positive electrode and the negative electrode is described. The Group 1 element can be on an surface of an electrode separator as a deposit. The Group 1 element can increase the charging capacity of the cell, eliminate the irreversible capacity of the cell, improve the rechargeable cell cyclability, or increase the charging reversibility of the cell.

43 Claims, 6 Drawing Sheets

LITHIUM ION ELECTROCHEMICAL CELL

BACKGROUND OF THE INVENTION

This invention relates to rechargeable lithium ion electrochemical cells.

A battery includes one or more galvanic cells (i.e., cells that produce a direct current of electricity) in a finished package. In each cell, two electrodes are separated by an electron insulator, but are joined by an ion-carrying path. The electron-carrying path of the battery is external; the path proceeds, via a conductor, through a device where work is done. The ion-carrying path of the battery is internal and proceeds via an electrolyte.

The electrodes are usually composed of dissimilar metals. The electrode where an electrolytic species receives electrons is the positive electrode, also referred to as the cathode. The electrode where an electrolytic species goes into solution, releasing electrons, is called the negative electrode, or anode. The electrolyte generally is composed mainly of an ionizable salt dissolved in a solvent.

Batteries may be rechargeable; such batteries are called "storage" or "secondary" batteries. Storage batteries can be recharged by passing current through the cells in the opposite direction of discharge current flow. The charging current restores the chemical conditions of the battery, preparing it to be discharged again. Primary batteries, on the other hand, are meant to be discharged to exhaustion once, and then discarded.

An example of a rechargeable battery is a lithium ion cell. The positive electrode of this cell can include, for example, a lithiated metal oxide, such as $LiCoO_2$, $LiNiO_2$, or $LiMn_2O_4$. The negative electrode can be, for example, a carbon or metal oxide electrode. The electrolyte in lithium ion cells can include a lithium salt (e.g., $LiPF_6$ or $LiClO_4$) dissolved in an aprotic solvent such as, for example, propylene carbonate or ethylene carbonate. An electrode separator is located between the positive electrode and negative electrode to prevent physical and electrical contact between the electrodes. Physical contact between the positive electrode and negative electrode leads to short circuiting which discharges the cell. The electrode separator insulates the electrodes from contact. The separator is porous (e.g., a porous organic polymer) and allows the electrolyte to migrate from one electrode to the other.

An example of the electrochemical process in a lithium-ion battery is as follows:

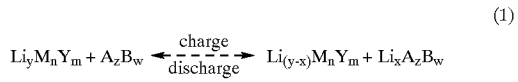

(1)

where $A_zB_w$ represents the negative electrode (e.g., carbon), $Li_yM_nY_m$ represents the positive electrode (e.g., $LiCoO_2$), $Li_{(y-x)}M_nY_m$ represents the lithium-depleted positive electrode (e.g., $LiCoO_2/CoO_2$), and $Li_xA_zB_w$ represents the lithium-enriched negative electrode (e.g., $Li_xC_6$). The lithiated metal oxide provides the source of lithium ions which shuffle back and forth between anode and cathode when the cell is charged and discharged.

Generally, the charge (or discharge) capacity is the amount of charge the cell accepts (or provides) to reach to the charge (or discharge) voltage (e.g., of 4.1 V or 2.8 V). The difference between charge and discharge capacity is the irreversible charging capacity.

Lithium ion cells tend to exhibit a loss in charging capacity during the first few charge/discharge cycles, which is possibly due to consumption of lithium. The loss in charging capacity is irreversible, and leads to decreased charge capacities in the cells because the positive electrode is not fully lithiated.

A characteristic of the materials used for both positive and negative electrodes is their intrinsic partial irreversibility. When carbon is used as a negative electrode in a lithium ion cell, the first charging capacity is always significantly higher than the first discharge capacity. For common carbon negative electrode materials, the irreversibility ranges from 10% to 30% of the first charge capacity (i.e., the first discharge capacity is only 90% to 70% of the first charge capacity). For typical positive electrode materials, however, the irreversibility is generally much lower. For $LiCoO_2$, for example, the first charge/discharge irreversibility is less than 5%. That is, the first discharge capacity is 95% of the first charge capacity.

Consequently, for design efficiency, the electrodes in a rechargeable cell generally are balanced (i.e., each electrode should have the same capacity). When positive and negative electrodes of different irreversibility are used together in a rechargeable cell, the cell typically is balanced in a manner that the first charge capacities of the two electrodes are the same. On use, the cell will only cycle to the reversible capacity of the most irreversible electrode. Therefore, the full reversible portion of the other electrode is not fully utilized. This can result in a lower than maximum capacity of the completed electrochemical cell.

SUMMARY OF THE INVENTION

The invention generally relates to placing a Group 1 element (e.g., lithium metal) between a positive electrode and negative electrode in a lithium ion cell in order to efficiently balance the electrodes of the cell. The Group 1 element, for example, may be a thin deposit on the surface of a separator, or on the surface of either electrode. The invention provides a number of potential benefits.

For example, the Group 1 element can be used to reduce or even eliminate an irreversible charging capacity in the cell by compensating for the irreversible capacity of one or both electrodes. The irreversible charging capacity can be reduced or eliminated by permitting the positive electrode (when using lithium or lithium ions in the cell) to be fully lithiated prior to or during the first few charge/discharge cycles. An electrode is lithiated by incorporating lithium or lithium ions into a host lattice, such as a carbon or metal oxide lattice. The lithium can be transported into and out of the host lattice. The electrode is fully lithiated when the host lattice cannot accept more lithium. The Group 1 element (e.g., lithium metal) can provide some or all of the additional charged material consumed during the first few charge/discharge cycles; as a result, fewer lithium or lithium ions in the host lattice are consumed.

Moreover, the Group 1 element can be used to increase the capacity of the cell. The overall reversible charge-carrying capacity of the cell increases when the Group 1 element is initially carried or located between the electrodes by allowing the positive electrode to be more completely lithiated during charging and thus allowing the balance to be optimized for maximum capacity.

Furthermore, the Group 1 element can be used to increase the charging reversibility of the cell. The charge is reversible when the amount of charge that an electrode can carry does not change by more than 10 percent, preferably less than or equal to 5 percent. By placing an amount of a Group 1 element capable of reducing an irreversible capacity of the cell between a positive electrode and a negative electrode of the cell before the first charging cycle of the cell, preferably between the separator and the negative electrode, the charging reversibility of the cell is increased.

In addition, the Group 1 element can be used to improve rechargeable cell cyclability. The charging capacity of a cell decreases as the cell is charged and discharged. By placing a Group 1 element between a positive electrode and a negative electrode of the cell before the first charging cycle of the cell, the charge capacity of the cell decreases by less than 20 percent, more preferably less than 10 percent, over 30 charging cycles. The cell cyclability is preferably improved by including the Group 1 element on a surface of the separator between the separator and the positive electrode.

Other features and advantages of the invention will be apparent from the description of the preferred embodiments and from the claims.

DESCRIPTION OF THE PREFERRED EMBODIMENTS

Figure 1:
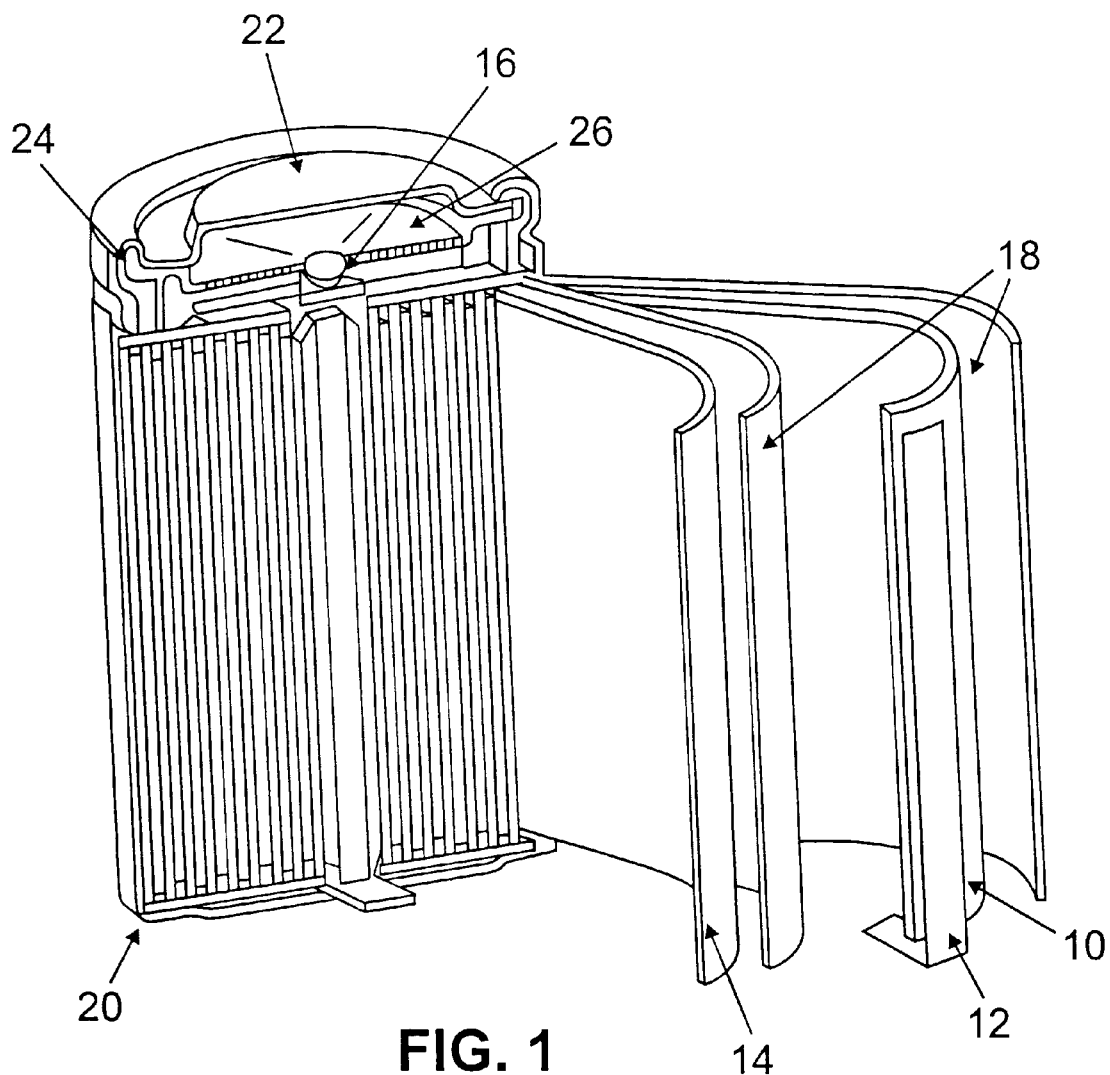
FIG. 1 is a sectional view of a storage cell.

Referring to FIG. 1, the storage cell, or battery, includes a negative electrode 10 in electrical contact with negative lead 12, a positive electrode 14 in electrical contact with positive lead 16, and a separator 18. The electrodes and the separator are contained within case 20. One end of case 20 is closed with cap 22 and annular insulating gasket 24 that provide a gas-tight and fluid-tight seal. Positive lead 16 connects positive electrode 14 to cap 22. Cap 22 includes a safety valve 26 disposed in the inner side of cap 22 which is configured to release pressure inside the cell when it exceeds a predetermined value.

Positive electrode 14 can include, for example, $LiNiO_2$, $LiCoO_2$, $LiMn_2O_4$ cobalt- or aluminum-doped $LiNiO_2$, or fluorine-doped $LiMn_2O_4$.

Negative electrode 10 can be, for example, a carbonaceous electrode including graphite, carbon, acetylene black, mesophase carbons, polyacenic semiconductors, or a metal oxide material such as amorphous doped tin oxide.

The electrode material (e.g., carbon or metal oxide) is mixed with a polymeric binding medium to produce a paste which is applied to a highly porous sintered, felt, or foam substrate. Electrode pieces of the appropriate size can be cut from the substrate.

Separator 18 is a porous polymer film or thin sheet that serves as a spacer and is composed of relatively non-reactive polymers such as, for example, polypropylene, polyethylene, a polyamide (i.e., a nylon), a polysulfone, or polyvinyl chloride (PVC). The separator is porous and prevents contact between the electrodes while allowing the electrolyte to move through the pores. The separator has a thickness between about 0.1 mm to 2.00 mm, preferably between about 0.20 mm to 0.50 mm. The separator preferably carries the composition including the Group 1 element. The separator does not react with the Group 1 element during the deposition process and can have a better tolerance for the deposition conditions than the electrode materials. A separator having lithium deposits that is used in a lithium ion cell can provide low overall irreversibility, high charge capacity, and good cyclability.

Separator 18 is cut into pieces of a similar size as the electrodes, and is placed between the negative and positive electrodes to separate them electrically. The electrodes and separator are wound into a Swiss roll, or jelly roll, as shown in FIG. 1, and placed in a case made of a metal such as nickel or nickel plated steel, or a plastic material such as PVC, polypropylene, a polysulfone, ABS, or a polyamide. Alternatively, the electrodes and separator can be cut to an appropriate size and sealed in a coin cell.

Case 20, containing the electrodes and separator, is filled with an electrolyte. The electrolyte may be any electrolyte known in the art. A preferred electrolyte is a 1M solution of $LiPF_6$ in an ethylene carbonate/dimethyl carbonate mixture.

Once filled with electrolyte, case 20 is then sealed with cap 22 and annular insulating gasket 24.

High capacity carbon electrodes and metal oxide anodes which have capacities in excess of 500 mAh/g can be highly irreversible. Irreversible capacity loss during the first charge/discharge cycle in the negative electrode or positive electrode can be reduced by including a thin deposit of a composition including a Group 1 element between the positive and negative electrodes in the lithium ion cell. The deposit has an average thickness less than 30 microns, preferably less than 20 microns, and more preferably less than 10 microns.

The deposit can form a continuous layer over a surface of the separator. The composition can be deposited on a surface of the positive electrode, a surface of the negative electrode, a surface of the separator, or combinations thereof. When the composition is located between the separator and the positive electrode, cyclability of the cell is improved in comparison to cells that do not include the deposit. When the composition is located between the separator and the negative electrode, irreversibility in the charge/discharge cycles is reduced. The cell capacity can be increased by at least 10 percent when compared to a similar cell that does not include the Group 1 element. The Group 1 element can be present in an amount capable of eliminating an irreversible capacity of the cell. The lithium ion cells prepared with the deposits can have improved 60° C. storability in comparison to lithium ion cells that were not prepared with the deposits.

Chemical or electrochemical pre-lithiation of the positive electrode, which can form lithiated materials that are unstable in air, can be avoided. Accordingly, since the cells can be prepared without pre-lithiated metal oxide materials, other high capacity metal oxides (e.g., derivatives of manganese oxides, vanadium oxides, or iron oxides) or insertion compounds can be used as positive electrode materials. The deposit can include a Group 1 element (e.g., lithium metal) which can reduce or eliminate the amount of lithiated metal oxides used in the lithium ion cell.

The composition includes a Group 1 element. The Group 1 element includes lithium, sodium, or potassium. The Group 1 element can be metals or metallic alloys, such as, for example, lithium metal, sodium metal, potassium metal, lithium silicon alloy, or lithium aluminum alloy. The composition can be vacuum deposited to form the deposits in the cells. Lithium metal is preferred since it is less reactive than the other Group 1 metals and is part of typical lithium ion cells. Alternative group 1 elements can be used in conjunction with suitable positive and negative electrodes.

Thin deposits (typically a few microns in thickness) of the composition (e.g., lithium, sodium, potassium, or lithium compounds) can be deposited on the carbon electrode surface by sputtering, evaporation, electron beam etching, vacuum deposition, or vapor deposition techniques. Alternatively, the deposits can be applied to a surface of the other electrode (i.e., the metal oxide electrode surface) or a surface of the separator by the same techniques. The deposition methods reduce the need to handle fragile, micron-thick metallic lithium foils that are not mechanically strong. The methods can be used to apply a thin deposit to any material suitable for use in a battery.

The preferred composition for the deposit is lithium metal. The overall reversible charge capacity in a cell can be increased by 10% to 30% when a thin layer of lithium metal is included in the cell. The thin layer of lithium metal is less than 30 microns thick, preferably less than 20 microns thick, and most preferably less than 10 microns thick (e.g., between 3 and 8 microns thick). The thin layer can help uniformly distribute the lithium metal throughout the cell.

Cell design can be aided by determining the appropriate amount of lithium metal to be deposited (i.e., on the separator). The amount can be calculated using the following equation (2):

$$M_{Li} \text{ (gram)} = (Q_{irre\ neg})/Q_{Li\ g} \quad (2)$$

where $Q_{irre\ neg}$ is the total irreversible capacity of the negative electrode material (in mAh/g), $Q_{Li\ g}$ is the gravimetric capacity of one gram of lithium metal (3860 mAh/g).

Alternatively, the appropriate average thickness of the lithium layer to be deposited (i.e., on the separator) can be calculated following equation (3):

$$T_{Li} \text{ (micron)} = (Q_{irre\ neg})/Q_{Li\ V} \times 10^{-4} \quad (3)$$

where $Q_{irre\ neg}$ is the total irreversible capacity of the negative electrode material (in mAh/cm$^2$), $Q_{Li\ V}$ is the volumetric capacity of one cubic centimeter of lithium metal (7283 mAh/cm$^3$).

By compensating for the irreversibility of the electrode with added lithium in the deposit, the cell is designed to maximize the benefit of this added lithium.

The total irreversible capacity can be determined by taking the difference between the charge capacity and the discharge capacity. The charge and discharge capacities of a reversible electrochemical cell are determined by charging or discharging a cell with conventional electrical power supplies and integrating the current over time to calculate the total charge delivered by the cell.

Equations (2) and (3) can be modified for other compositions by using the gravimetric capacity of the material. The gravimetric capacities of the alkali metals and some lithium compounds are: lithium=3861 mAh/g; sodium=1166 mAh/g; potassium=686 mAh/g; lithium fluoride =1033 mAh/g; lithium chloride=632 mAh/g; lithium bromide =309 mAh/g; and lithium iodide=200 mAh/g. The volumetric capacity can be determined by multiplying the gravimetric capacity by the density of the material.

Prior to or after two or three charge/discharge cycles, the lithium deposit is consumed, resulting in the formation of a lithium ion cell which consists of lithiated metal oxide cathode and carbon anode. The deposit material is incorporated into active cyclable lithium. The operation of a lithium ion cell including a separator having a lithium metal deposit in this manner can be unexpected since the lithium metal deposit reduces the porosity of the separator.

Prior to the initial charging of the cell, some of the lithium deposit can electrochemically react with the electrode against which is positioned. Even if the lithium deposit is not completely reacted, there is a means by which the deposit may react.

Without intending to be bound to any one theory, it appears that when current is passed through the cell in a lithium electrolyte, the separator having a deposit may act as a bipolar electrode. The current causes residual lithium metal to strip from one side quantitatively as lithium is deposited on the other. Eventually, the lithium being deposited makes electrical contact with the neighboring electrode and there is a direct reaction with the partially charged/discharged electrode. Ultimately, the lithium metal carried into the cell via the separator is incorporated as active cyclable lithium, thereby increasing the capacity of the rechargeable cell.

The following examples illustrate the invention.

EXAMPLE 1

Coating experiments were performed in a Denton Vacuum DV-502 model High Vacuum Evaporator machine located in a dry room where the relative humidity is below 1.5 percent. The deposits were prepared in a chamber which was under a high vacuum of 10$^{-6}$ torr and covered by a transparent bell jar which allowed the operator to watch the inside of the chamber during operation. The polymeric separator, (e.g., Celgard 2300 separator) was placed on a rotating plate which is mounted in the upper part of vacuum chamber above a lithium source. Lithium metal (0.05 gram) (99+% Purity) was loaded in an aluminum oxide crucible (1.8 cm outer diameter (OD)×1.8 cm height, Kurt J. Lesker Company). The crucible containing lithium was loaded into a tungsten basket heater (EVB8A3030W, Kurt J. Lesker Company). The distance between the lithium metal source and the separator ranged between 25 to 10 centimeters, depending on the desired lithium deposit thickness.

Trial #1

Celgard 2300 separator specimens (6×9 centimeters) were mounted on the rotating plate located above the lithium source (25 centimeters). After reducing the pressure in the chamber to about 10$^{-6}$ torr, a 15 mA current was passed through the basket heater for 2–3 minutes to preheat the lithium metal and crucible. The heater turned to red color for a few minutes. The current was gradually increased to 19–20 mA. After 3–5 minutes at the higher current level, the lithium metal was heated to a temperature close to its boiling point at the pressure in the chamber and the lithium started to evaporate. This was confirmed by a darkening of the transparent bell jar. The operation was continued for an additional 5 minutes. The current was gradually reduced to zero. During the operation, the plate above the lithium source was continually rotated at a constant speed between 5 and 50 rotations per minute. After 30 minutes cooling down, the chamber was vented with high purity argon gas. A shiny, silver-like deposit can be seen on the surface of the coated separator specimens.

Three discs (each 1.59 centimeters in diameter) were punched out from the separator deposited with lithium and placed in a 7 mL vial which was sealed in the dry room. Outside the dry room, five milliliters of water was introduced into each vial using a 10 mL syringe. The lithium deposited on separator reacted with water immediately and was converted to lithium hydroxide. The resulting solution was analyzed by inductively coupled plasma atomic emission spectroscopy (ICP) and the total concentration of lithium was determined against a standard acid solution.

The average thickness of the lithium deposit deposited on the separator was calculated from the total amount of lithium in the solution, total area of the disk, and the physical density of lithium. The average thickness of the lithium deposits in Trial #1 were 0.5–1.5 µm.

Trial #2

Celgard 2300 separator specimens (6×20 centimeters) were mounted on the plate above the lithium source. The distance between lithium source and separator specimens was reduced to 15 centimeters. The deposition experiment then was carried out following the procedures described in Trial #1.

The lithium deposits on the separator specimens were analyzed following the same procedures used in Trial #1. The average thickness of the lithium deposits in Trial #2 were 2.0–2.5 µm.

EXAMPLE 2

A carbon electrode containing mesocarbon microbeads (MCMB) (hereafter, referred as "MCMB"), conductive material, Shawinigan acetylene black (SAB), and polyvinylidenefluoride (PVDF) binder in a ratio of about 85:5:10 by weight (MCMB:SAB:PVDF) was prepared by the following procedure.

A solution of PVDF was made by dissolving PVDF in N-methyl pyrrolidone (NMP) with stirring overnight. MCMB powder and SAB were mixed in a rotary mixture for 20 minutes based on the ratio described above. The powder mixture was added to the binder solution gradually with stirring to form a wet slurries. The wet slurry was coated on a copper foil substrate (about 200 µm in thickness) which acts as a current collector. The electrodes were dried at a temperature up to about 200° C. for 10 hours to remove the residual solvent. After cooling to room temperature, the electrodes were calendered with a pressure of between 500 and 2000 psi in a roller.

The carbon electrodes were dried at 150° C. for at least 4 hours before depositing a lithium coating on the surface. The electrodes were mounted on the rotating plate in the evaporator which was located 25 centimeters above the lithium source. The lithium deposit was made using the procedure described in Example 1. A copper foil substrate was placed along side the carbon electrode as a control to confirm deposition of lithium.

The lithium deposit deposited on the copper foil and carbon electrode was stable in the dry room atmosphere for at least 3 days. In contrast, chemically prepared pre-lithiated electrodes were very unstable in a dry-room atmosphere and decomposed rapidly. The thickness of the lithium deposit deposited on copper foil was between 1 and 2 microns, as determined by the method described in Example 1.

Coin type cells with a lithium metal electrode and a carbon electrode having the lithium deposit was made by laminating 1.43 centimeter diameter disks of lithium metal and carbon electrodes. A Celgard 2300 separator (1.91 centimeters in diameter) was placed in between the lithium metal electrode and the carbon electrode, with the lithium-coated surface of the carbon electrode facing the separator. The cells were filled with $LiPF_6$ in EC/DMC (a non-aqueous electrolyte). The cells were sealed using a crimper so that the electrolyte would not leak out of the cell. The assembly of the coin cells was carried out in a glove box which was filled with inert gas to protect against decomposition or other adverse reactions caused by moisture. For comparison, coin cells with a carbon electrode that did not have the lithium deposit were made as a control.

Figure 2:
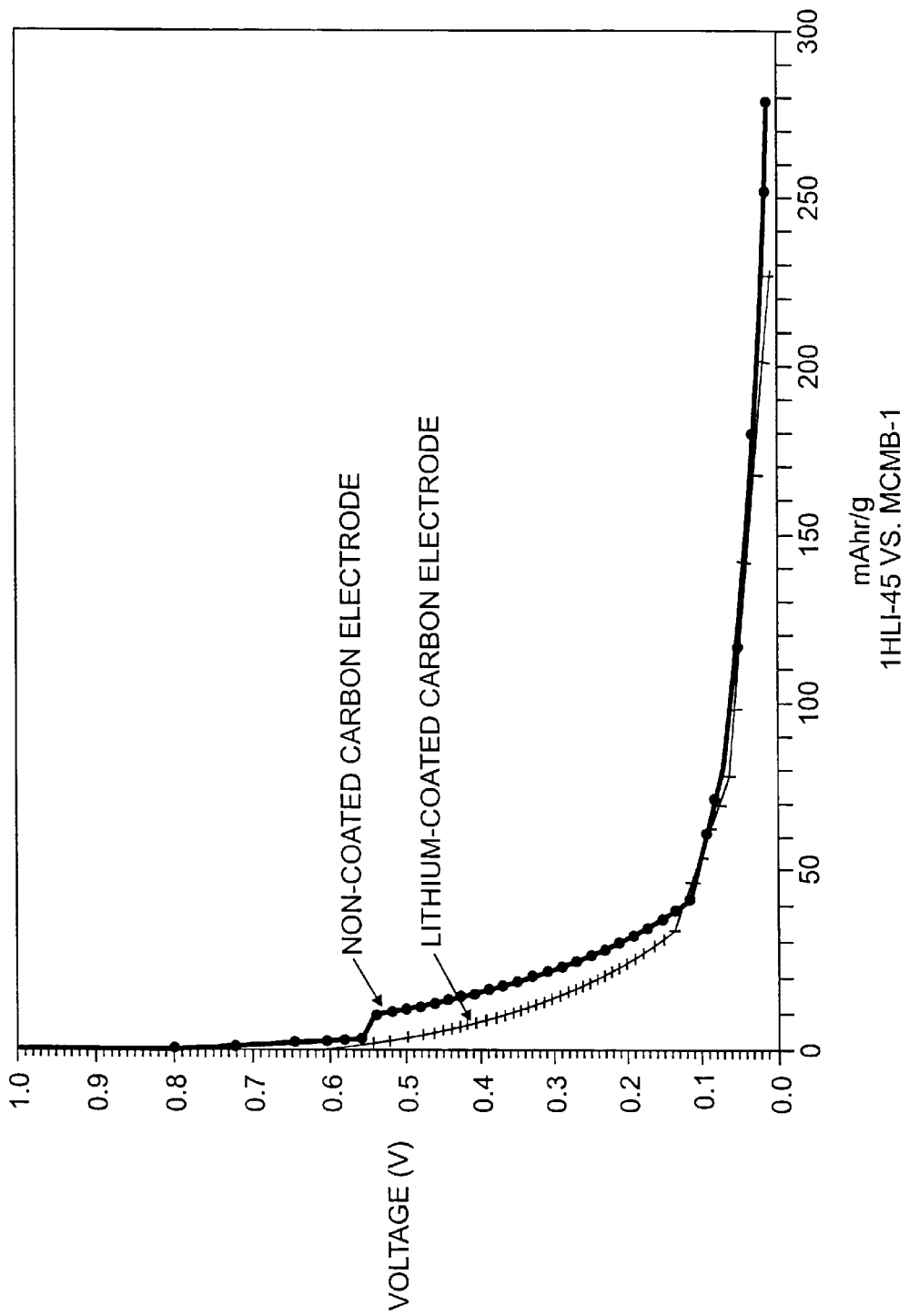
FIG. 2 is a graph depicting the voltage for various charge capacities for a lithium ion cell.

The coin cells were discharged with a constant current of 0.2 mA (0.12 $mA/cm^2$) to 0.001 V versus lithium metal. The discharge curves of cells made from the carbon electrode having the lithium deposit and the control cell are shown in FIG. 2. The cell having the lithium coated carbon electrode showed no first cycle irreversible capacity loss. Irreversible capacity loss can be suggested by a passivation plateau, such as the one that was present in the discharge curve of control cell. The reversible charge capacity of the cell was increased by about 10% to 20% over a comparable cell without the lithium deposit.

EXAMPLE 3

Lithium ion coin cells were assembled from an anode (MCMB electrode), cathode ($LiCoO_2$), and a Celgard 2300 separator. The separator optionally had a lithium deposit, prepared as described in Example 1. The lithium was deposited to an average thickness of about 3.6 µm, as determined by the method described in Example 1.

The MCMB electrode was prepared by the procedures described in Example 2. The $LiCoO_2$ electrode was prepared by compressing $LiCoO_2$ powder (92%), SAB conductive material (3%), and a polytetrafluoroethylene (PTFE) binder (5%) on an aluminum grid substrate in a die having a diameter of 1.43 centimeters.

Disk-like electrodes and separator that were 1.59 centimeters in diameter were used to assemble the coin cells. The cells were balanced by using the capacity of the active materials at the first lithiation/delithiation (change) of 330 mAh/g for the MCMB electrode and 140 mAh/g for the $LiCoO_2$ electrode. The anode and cathode were dried at about 150° C. for 16 and 4 hours, respectively. The coin cells were assembled by facing the surface of separator having the lithium deposit toward to the cathode (face-the-cathode; FTC) or the anode (face-the-anode; FTA), respectively. Control cells were assembled using an unmodified separator. Cell assembly was completed in a glove box filled with argon gas. $LiPF_6$ in EC/DMC was used as the non-aqueous electrolyte.

The lithium ion coin cells were cycled between 2.8 and 4.2 V with a current of 0.5 mA (0.31 $mA/cm^2$ based on cathode surface area). The cells were evaluated under two cycling conditions, as described in Trials #3 and #4, respectively.

Trial #3

Coin cells with the separator having a lithium deposit and FTC configuration were charged to 4.2 V at a constant current of 0.5 mA (0.31 mA/cm$^2$) following trickling at the voltage. The charge was stopped after 24 hours in this trial. After one hour of rest from the end of charge, the cells were discharged to 2.8 V with a constant current of 0.5 mA (0.31 mA/cm$^2$). The next charge/discharge cycle started after one hour of rest from the previous discharge. The charge/discharge cycling test was continued for up to thirty cycles. For comparison, control cells were cycled under the same conditions.

Figure 3:
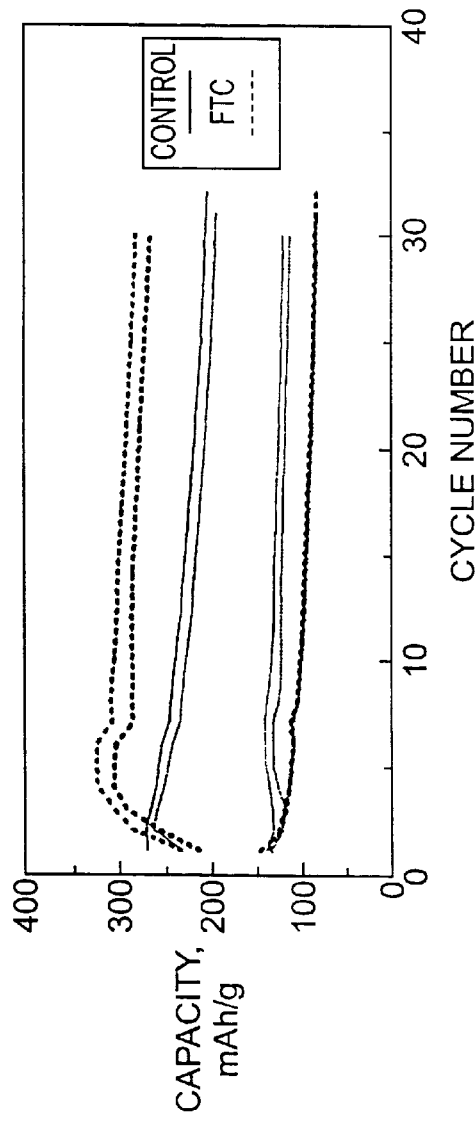
FIG. 3 is a graph depicting the discharge capacity of a lithium ion cell having a separator with a lithium deposit and a lithium ion cell without a lithium deposit.

FIG. 3 shows the discharge capacity of FTC cells and the control cells. There were two cells in each group (e.g., FTC and control). The cell capacities were presented in gravimetric capacities based on active anode and cathode materials. The top set of curves represent the anode gravimetric capacity, while the bottom set of curves represent cathode gravimetric capacity. The FTC cells had higher discharge capacities than the control cells. At cycle 5, for example, the anode discharge capacity of cells with lithium deposit was 311 mAh/g (two cells average). In contrast, the discharge capacity of cells without lithium deposit was 248 mAh/g.

After 30 cycles, FTC cells (i.e., with separator having the lithium deposit) delivered a 273 mAh/g anode discharge capacity, while control cells (i.e., without the lithium deposit) showed a 200 mAh/g anode discharge capacity. Thus, the anode discharge capacity can be improved by about 25–30% by using separator having lithium deposit.

Trial #4

FTA and FTC coin cells were cycled by a constant current and low voltage cut-off regime. The cells were charged to 4.1 V at 0.5 mA (0.31 mA/cm$^2$ based on cathode surface area) without trickle and were discharged to 2.8 V at the same current density. The rest time after both charge and discharge was about one hour. The cycling test were continued for up to thirty cycles. For comparison, control cells were tested under the same conditions.

Figure 4:
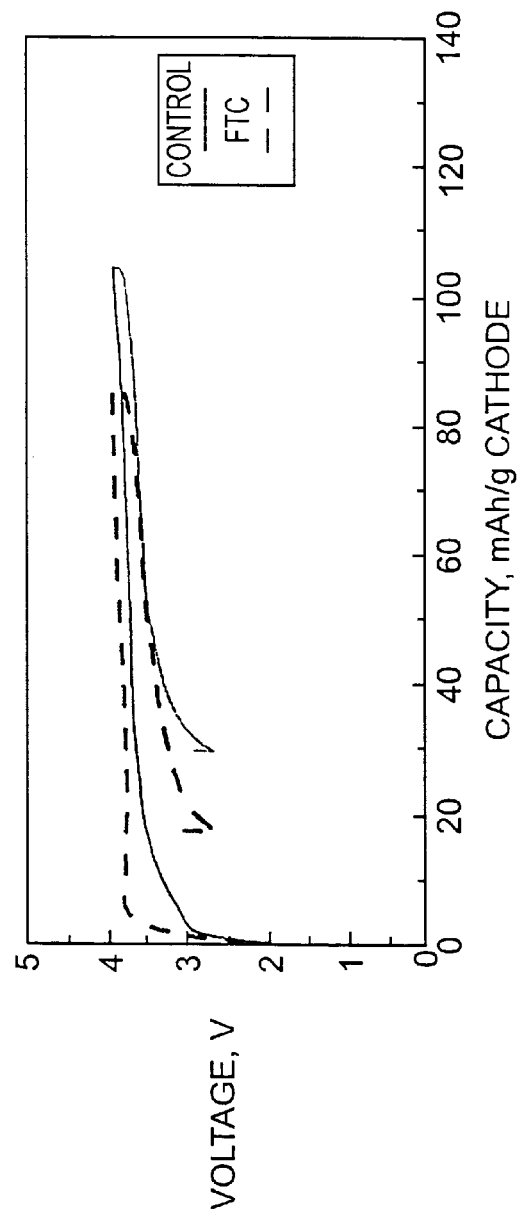
FIG. 4 is a graph depicting the first cycle charge/discharge capacity of a lithium ion cell having a separator with a lithium deposit and a lithium ion cell without a lithium deposit.
Figure 5:
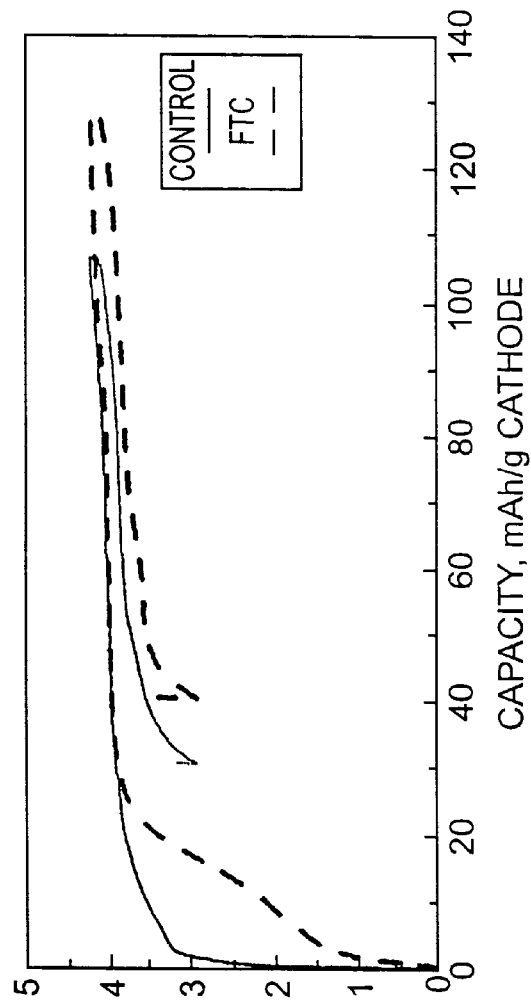
FIG. 5 is a graph depicting the first cycle charge/discharge capacity of a lithium ion cell having a separator with a lithium deposit and a lithium ion cell without a lithium deposit.

FIGS. 4 and 5 show the change in cell charge/discharge capacity at first cycle as the cell voltage is changed. Referring to FIG. 4, cells having the separator with the lithium deposit in the FTA configuration were compared to the control cells. The FTA cells had a lower irreversible capacity than the control cells. For instance, the irreversible capacity in the FTA cells and the control cells were 18 and 30 mAh/g, respectively, which was about 40% lower than control cell. Referring to FIG. 5, cells having the separator with the lithium deposit in the FTC configuration were compared to the control cells. The FTC cells had a higher charge capacity than the control cells. The first charge capacity was 125 mAh/g cathode for the FTC cell and 105 mAh/g cathode for the control cell. The irreversible capacity after first discharge in the FTC cell (40 mAh/g), however, was larger than in the control cell (30 mAh/g).

Figure 6:
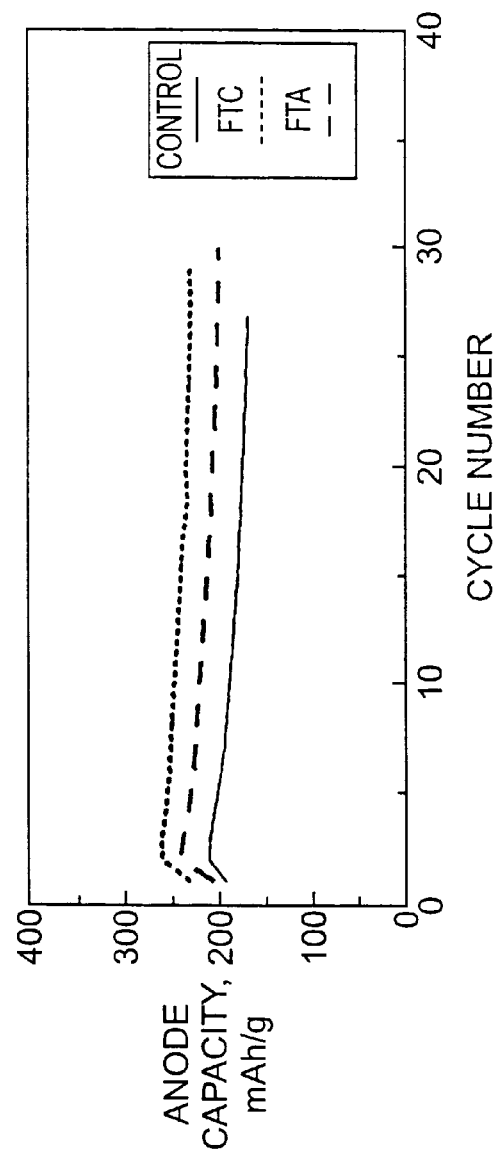
FIG. 6 is a graph depicting the cyclability of a lithium ion cell having a separator with a lithium deposit and a lithium ion cell without a lithium deposit.

FIG. 6 is a plot of the anode gravimetric discharge capacity as a function of the cycle number applied for cells in three different configurations. Cells having the lithium deposit on the separator in the FTC or FTA configuration had higher discharge capacities than the control cells. The FTC configuration delivered the highest discharge capacity at cycle five (258 mAh/g). In comparison, the control cell had a discharge capacity at cycle five of 203 mAh/g. The discharge capacity of this trial, however, was lower than that obtained in Trial #3 at the same cycle number (i.e., 258 mAh/g compared to 311 mAh/g at cycle five). This can be due to the low cut-off voltage and the lack of trickle charge regime in this trial (i.e., 4.1 V rather than 4.2 V with trickle).

The results in Trials #3 and 4 indicate that a lithium deposit on the separator can reduce the irreversibility of lithium ion cells, and increase the reversible discharge capacity over thirty charge/discharge cycles. Cycle life was significantly improved in the cell that included the separator having the lithium deposit. The cell had excellent cyclability as indicated by 10% fading of capacity after 20 cycles. The control cell faded about 20% in capacity under the same cycling conditions. There was no direct evidence of either plating lithium or over-charging of the cathode. There was no evidence of lithium dendrite formation, which can create short circuits in the cell, in coin cells after about six charge/discharge cycles.

Trial #5

Cells having separator with and without the lithium deposit from Trial #3 were examined after five charge/discharge cycles in an argon-filled glove box to inspect the condition of the separator. The cycling was terminated at charge status so that the lithium plating, if any, could be observed. Upon examination, the separator specimens were wet with solvent and transparent, suggesting that the lithium deposit had been consumed during the cycling. There was no evidence of lithium plating found on either the anode or the separator.

Lithium and cobalt contents of the cathode materials ($LiCoO_2$) were determined by chemical analysis. The cathode materials from the examined cells were heated in a $HCl/H_2O_2$ solution to boiling for at least 4 hours. The solution was filtered and diluted to a known volume. The solution was analyzed by ICP against matrix-matched standards to determine the lithium and cobalt contents of the electrodes. Table I shows the analytical results for the FTC cells and control cells. The cathode materials taken from the FTC cells had higher lithium concentrations than the control cells, as indicated by the larger molar ratio. The higher lithium concentrations suggest that the lithium deposit facing the cathode can deliver excess charge capacity during cycling.

TABLE I

| Cell type | Lithium content (%) | Cobalt content (%) | Li:Co (Mole ratio) |
|---|---|---|---|
| Control | 0.42 | 7.38 | 0.48:1 |
| FTC | 0.47 | 6.85 | 0.58:1 |

Trial #6

The coin cells of Trial #4 were examined after thirty cycles in an argon-filled glove box to inspect the condition of the separator and to look for possible lithium dendrite formation. The cycling was terminated in both the charge and discharge states to investigate lithium plating, if any, and the lithium concentration in the cathode material. The results indicated that the separator specimens were wet with solvent and transparent. No lithium plating was found on the anode. These results, combined with those in Trial #5, suggest that lithium deposits or dendrites do not remain or form on the anode or separator during cycling.

EXAMPLE 4

Lithium metal was deposited on Celgard 2300 separator as described in Example 3. The deposits had average thicknesses of 4 and 8 $\mu$m, respectively, as determined by the method described in Example 1. The lithium ion coin cells were made from an MCMB anode, a spinel $LiMn_2O_4$ cathode, and the Celgard 2300 separator. A separator without the lithium deposits was used to prepare control cells.

The anodes and cathodes were made by the procedures described in Examples 2 and 3. The separators (1.59 centimeter in diameter) having the two thickness of lithium deposits were used in cell assembly. The cells were designed to be balanced by a 10% excess anode capacity based on the capacities of active materials (e.g., 330 mAh/g for the MCMB electrode and 120 mAh/g for the $LiMn_2O_4$ electrode) during the first lithiation/delithiation cycle. After drying the anodes and cathodes at the conditions used in Example 3, FTC, FTA and control coin cells were assembled. The non-aqueous electrolyte was $LiPF_6$ in EC/DMC.

Figure 7:
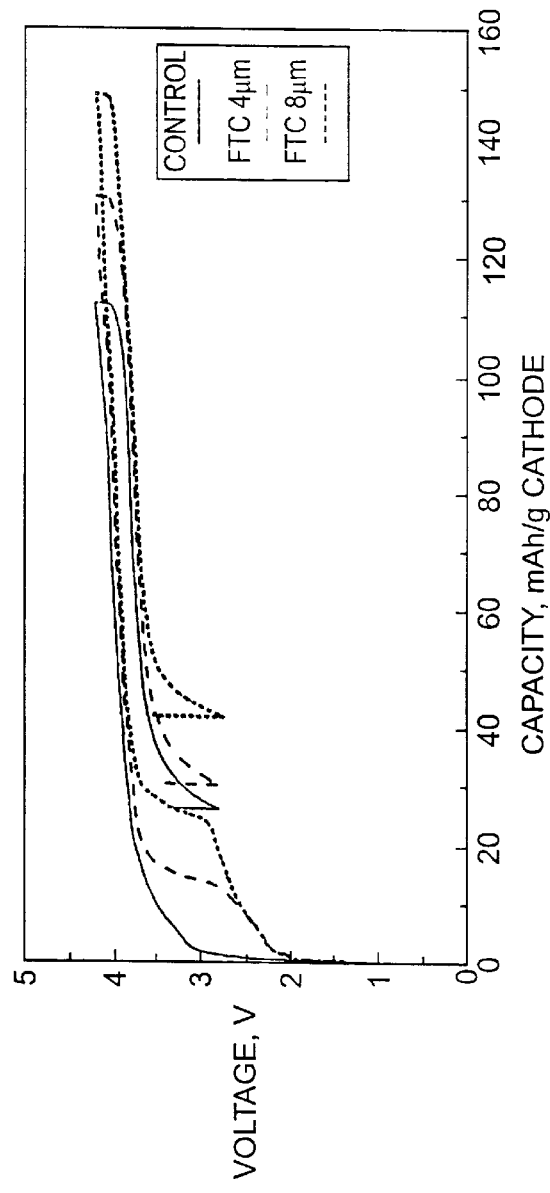
FIG. 7 is a graph depicting the first cycle charge/discharge capacity of a lithium ion cell having a separator with a lithium deposit and a lithium ion cell without a lithium deposit.

The cells were cycled between 4.3 and 2.8 V at 1 mA (0.62 $mA/cm^2$ based on the surface area of the cathode) constant current for charge and 2 mA (1.25 $mA/cm^2$) for discharge. FIG. 7 shows a plot of the charge/discharge capacity against the voltage at the first cycle for the FTC cells having lithium deposits 4 and 8 $\mu$m thick, respectively, and the control cell. A voltage plateau was found during the first charge around 3 V, which is considered an indicator of lithium intercalation into the spinel structure. The capacity regimes in which a voltage plateau presents appear to be nearly proportional to the average thickness of the lithium deposit. The charge capacity also increases with the average thickness of lithium deposit.

Figure 8:
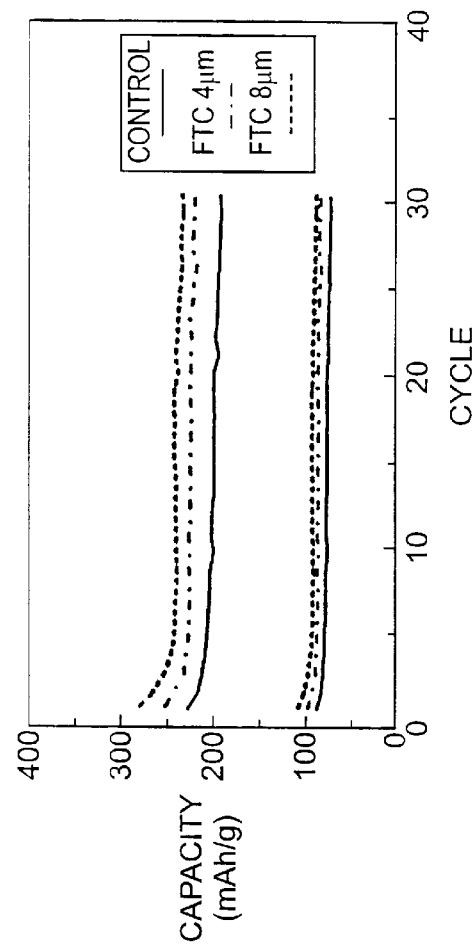
FIG. 8 is a graph depicting the cyclability of a lithium ion cells having a separator with different thicknesses of a lithium deposit and a lithium ion cell without a lithium deposit.
Figure 9:
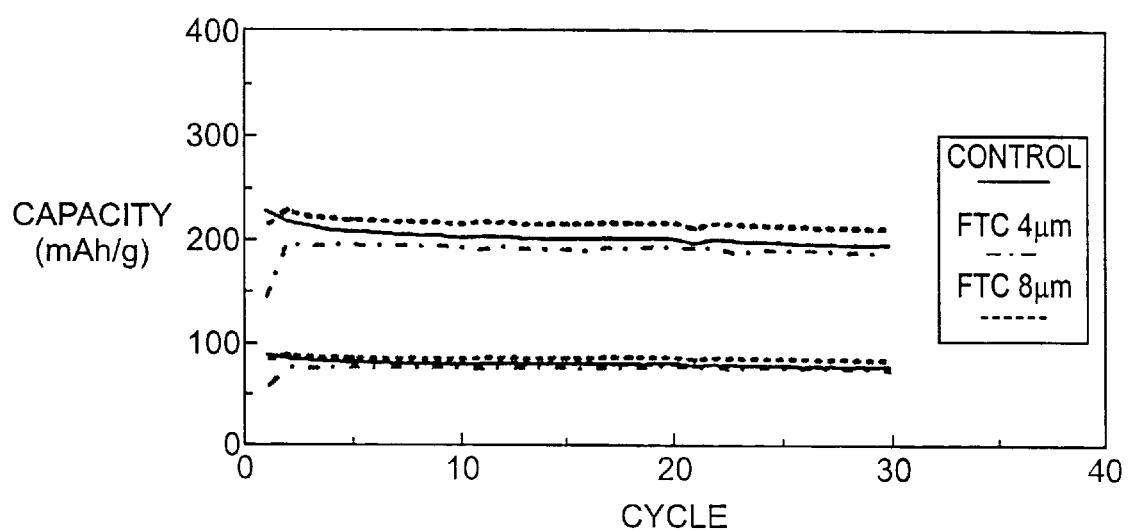
FIG. 9 is a graph depicting the cyclability of a lithium ion cells having a separator with different thicknesses of a lithium deposit and a lithium ion cell without a lithium deposit.

FIGS. 8 and 9 depict the cyclability of FTA, FTC, and control cells. The FTC and FTA cells delivered higher discharge capacity than the control cell over thirty cycles. The FTC and FTA cells had nearly the same cyclability over the thirty cycles.

Other embodiments are within the claims.

What is claimed is:

1. An electrode separator comprising a deposit including a Group 1 element and having a thickness less than 30 microns, the deposit grown on a surface of the separator.

2. The electrode separator of claim 1, wherein the Group 1 element is lithium.

3. The electrode separator of claim 2, wherein the deposit forms a continuous layer over the surface of the separator.

4. The electrode separator of claim 3, wherein the separator includes a porous polymer.

5. The electrode separator of claim 4, wherein the separator is a sheet having a thickness between 200 and 500 microns.

6. The electrode separator of claim 5, wherein the deposit has a thickness less than 20 microns.

7. The electrode separator of claim 6, wherein the deposit has a thickness less than 10 microns.

8. A method of manufacturing an electrode separator comprising growing a deposit including a Group 1 element on a surface of a separator, the deposit having a thickness of less than 30 microns.

9. The method of claim 8, wherein the Group 1 element is lithium.

10. The method of claim 9, wherein growing includes vacuum deposition.

11. The method of claim 9, wherein growing includes vapor deposition.

12. The method of claim 9, wherein growing includes evaporation.

13. The method of claim 9, wherein growing includes sputtering.

14. The method of claim 9, wherein growing includes electron beam etching.

15. The method of claim 9, wherein the deposit has a thickness less than 20 microns.

16. The method of claim 9, wherein the deposit has a thickness less than 10 microns.

17. A rechargeable lithium ion cell comprising:
a positive electrode;
a negative electrode;
a deposit including an amount of a Group 1 element capable of eliminating an irreversible capacity of the cell between the positive electrode and the negative electrode of the cell, the deposit having a thickness of less than 30 microns; and
a separator between the positive electrode and the negative electrode of the cell.

18. The rechargeable lithium ion cell of claim 17, wherein the Group 1 element is lithium.

19. The rechargeable lithium ion cell of claim 18, wherein the deposit is located on a surface of the positive electrode.

20. The rechargeable lithium ion cell of claim 18, wherein the deposit is located on a surface of the negative electrode.

21. The rechargeable lithium ion cell of claim 18, wherein the deposit is located on a surface of the separator.

22. The rechargeable lithium ion cell of claim 21, wherein the deposit is located between the separator and the positive electrode.

23. The rechargeable lithium ion cell of claim 21, wherein the deposit is located between the separator and the negative electrode.

24. A method of increasing charging capacity in a rechargeable cell comprising placing a composition including a Group 1 element between a positive electrode and a negative electrode of the cell before the first charging cycle of the cell, the composition having a thickness less than 30 microns, whereby the cell capacity is increased by at least 10 percent in comparison to comparable cell that does not include the Group 1 element.

25. The method of claim 24, wherein the Group 1 element is present in an amount capable of eliminating an irreversible capacity of the cell.

26. The method of claim 24, wherein the composition is placed on a surface of the positive electrode.

27. The method of claim 26, wherein the composition is placed on a surface of the negative electrode.

28. The method of claim 26, wherein the cell includes a separator between the positive electrode and the negative electrode of the cell.

29. The method of claim 28, wherein the composition is placed on a surface of the separator.

30. The method of claim 29, wherein the composition is located between the separator and the positive electrode.

31. The method of claim 29, wherein the composition is located between the separator and the negative electrode.

32. The method of claim 24, wherein the Group 1 element is lithium.

33. A method of improving rechargeable cell cyclability comprising placing a composition including a Group 1 element between a positive electrode and a negative electrode of the cell before the first charging cycle of the cell, the composition having a thickness less than 30 microns, whereby the charge capacity of the cell decreases by less than 20 percent over 30 charging cycles.

34. The method of claim 33, wherein the cell includes a separator between the positive electrode and the negative electrode of the cell.

35. The method of claim 34, wherein the composition is placed on a surface of the separator.

36. The method of claim 35, wherein the composition is located between the separator and the positive electrode.

37. The method of claim 36, wherein the charge capacity decreases by less than 10 percent over 30 charging cycles.

38. The method of claim 33, wherein the Group 1 element is lithium.

39. A method of increasing charging reversibility of a rechargeable cell comprising placing an amount of a composition including a Group 1 element capable of reducing an irreversible capacity of the cell between a positive electrode and a negative electrode of the cell before the first charging cycle of the cell, the composition having a thickness less than 30 microns.

40. The method of claim 39, wherein the cell includes a separator between the positive electrode and the negative electrode of the cell.

41. The method of claim 40, wherein the composition is placed on a surface of the separator.

42. The method of claim 41, wherein the composition is located between the separator and the negative electrode.

43. The method of claim 39, wherein the Group 1 element is lithium.

* * * * *